(12) United States Patent
Hirasawa

(10) Patent No.: US 8,582,167 B2
(45) Date of Patent: Nov. 12, 2013

(54) PRINT CONTROL APPARATUS, PROGRAM, AND PRINT CONTROL METHOD WITH REDUCED RECORDING AGENT CONSUMPTION

(75) Inventor: Masahiko Hirasawa, Sapparo (JP)

(73) Assignee: Seiko Epson Corporation, Tokyo (JP)

( * ) Notice: Subject to any disclaimer, the term of this patent is extended or adjusted under 35 U.S.C. 154(b) by 281 days.

(21) Appl. No.: 13/111,797

(22) Filed: May 19, 2011

(65) Prior Publication Data

US 2011/0286021 A1 Nov. 24, 2011

(30) Foreign Application Priority Data

May 24, 2010 (JP) ................................. 2010-118480

(51) Int. Cl.
*H04N 1/387* (2006.01)
*H04N 1/50* (2006.01)
*G06K 15/02* (2006.01)
*H04N 1/00* (2006.01)

(52) U.S. Cl.
CPC ....... *H04N 1/00005* (2013.01); *H04N 1/00031* (2013.01); *G06K 15/1825* (2013.01); *G06K 15/1869* (2013.01)

USPC ........... 358/1.18; 358/504; 358/406; 358/450

(58) Field of Classification Search
USPC .......... 358/1.9, 2.1, 1.18, 501, 504, 518, 527, 358/401, 406, 450
See application file for complete search history.

(56) References Cited

U.S. PATENT DOCUMENTS

| | | | |
|---|---|---|---|
| 7,796,296 B2* | 9/2010 | Martinez et al. | 358/1.9 |
| 8,089,648 B2* | 1/2012 | Chung et al. | 358/1.9 |
| 8,390,889 B2* | 3/2013 | Iguchi | 358/1.9 |
| 2004/0227964 A1* | 11/2004 | Fujino | 358/1.9 |

FOREIGN PATENT DOCUMENTS

| | | |
|---|---|---|
| JP | 09-058092 A | 3/1997 |
| JP | 2009-12294 A | 1/2009 |

* cited by examiner

*Primary Examiner* — Scott A Rogers
(74) *Attorney, Agent, or Firm* — Maschoff Brennan

(57) ABSTRACT

When a plurality of test copies of an identical image are required, print data of the first page is created from the same image that is used in regular printing and is test-printed; the second and following pages are test-printed using a simplified image that is created by extracting only contour portions of the image.

12 Claims, 6 Drawing Sheets

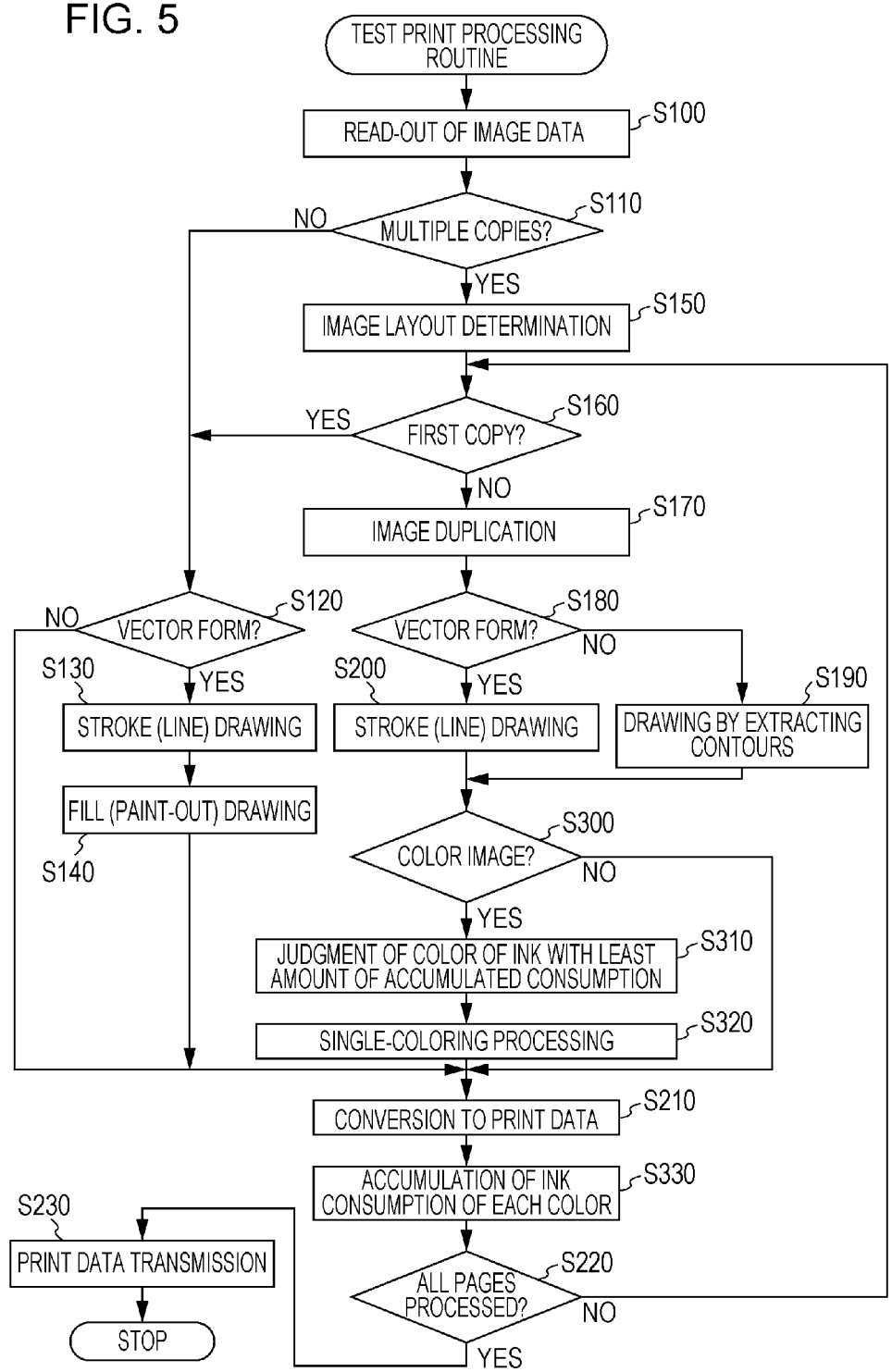

PRINT CONTROL APPARATUS, PROGRAM, AND PRINT CONTROL METHOD WITH REDUCED RECORDING AGENT CONSUMPTION

BACKGROUND

1. Technical Field

The present invention relates to a print control apparatus that controls a print apparatus capable of printing an image consuming a recording agent in accordance with image data, a program that causes a computer to function as a print control apparatus, and a print control method.

2. Related Art

Thus far, print control apparatuses capable of test printing prior to regular printing have been proposed as the above-mentioned type of print control apparatus (for example, see JP-A-2009-12294). The print control apparatus described in JP-A-2009-12294, upon receiving a command of test printing, performs test printing while putting a waste paper mark on the print, and also receives a command of switching from the test to regular printing via an operator panel; when the command of switching to the regular printing is actually received, the apparatus finishes the test printing with the waste paper mark and starts the regular printing.

As mentioned above, in order to check if there is any problem in the setting of a print apparatus or in print data, test printing is often carried out prior to regular printing. In the test printing, in addition to confirmation of a tone of color, a tint of color and the like, confirmation of a layout such as location and arrangement of the print subject is sometimes needed. In the case where multiple test copies of an image that is the same as an image for regular printing are printed, a large amount of recording agent will be consumed during the printing of the multiple test copies because the consumption of the recording agent such as toner and ink is proportional to the number of copies. On the other hand, the same image that is to be printed in regular printing needs to be output to confirm a tone of color, a tint of color and the like by the test printing, however the layout can be satisfactorily confirmed only by checking location information.

SUMMARY

An advantage of some aspects of the invention is to provide a print control apparatus, a program and a print control method that suppress the consumption of recording agents during the printing of multiple test copies.

A print control apparatus, a program and a print control method according to the invention have employed the following configurations and methods to achieve the advantage mentioned above.

A print control apparatus according to an aspect of the invention is a print control apparatus that controls a print apparatus capable of printing an image consuming a recording agent in accordance with image data, and includes: an image data obtaining unit that obtains image data; and a print control unit that creates image data for test printing that consumes a less amount of recording agent than the printing based on the obtained image data upon receiving a command to print multiple test copies, controls the printing of at least one copy based on the obtained image data among the multiple copies, and controls the printing of the remaining copies based on the created image data for the test printing.

The print control apparatus according to the invention creates image data for test printing that consumes a less amount of recording agent than the printing based on the obtained image data upon receiving a command to print multiple test copies, controls the printing of at least one copy based on the obtained image data among the multiple copies, and controls the printing of the remaining copies based on the created image data for the test printing. This makes it possible to confirm a print result of the multiple test copies and also possible to reduce the amount of recording agent consumed in the test printing. The "recording agent" is not limited to a specific material as long as it can be used for printing. Therefore, toner, ink, and the like can be cited as a recording agent.

In the print control apparatus according to the invention, it is preferable for the image data obtaining unit to be capable of obtaining raster-type image data and for the print control unit to be a unit that extracts edges of the obtained raster-type image data and creates an image for test printing by line drawing upon receiving the command to print multiple test copies.

Further, in the print control apparatus according to the invention, it is preferable for the image data obtaining unit to be capable of obtaining vector-type image data and for the print control unit to be a unit that creates an image for the test printing by omitting the filling of the obtained vector-type image data upon receiving the command to print multiple test copies.

Furthermore, in the print control apparatus according to the invention that controls a print apparatus capable of printing an image using recording agents of multiple colors, it is preferable for the image data obtaining unit to be capable of obtaining a color image and for the print control unit to be a unit that creates an image for the test printing by causing the obtained color image to be single-colored upon receiving the command to print multiple test copies. In this case, it is preferable for the print control apparatus to include a usage history memory unit that stores a usage history of each of the recording agencies of multiple colors, and the print control unit to judge the least frequently used-recording agent from among the recording agencies of multiple colors based on the stored usage histories and create an image for the test printing by causing the obtained color image to be single-colored using the color corresponding to the color of the recording agent that has been judged to be the least frequently used-one. Further, it is preferable for the print control apparatus to include a color designation receiving unit that receives the designation of a color from a user to be used for making a single-colored image, and the print control unit to create an image for the test printing by causing the obtained color image to be single-colored using a designated color.

A program according to an aspect of the invention causes a computer to function as any one of the print control apparatuses according to the aspects of the invention. It is preferable that the program be stored in a medium from which a computer can read out data (for example, a hard disk, ROM, FD, CD, DVD or the like), be transmitted from a certain computer to another computer through the transmission media (communications networks such as the Internet, LAN and the like), or be sent and received in any other appropriate form. When the program is executed on a computer, it brings the same operational effect as that of the above-mentioned print control apparatus.

A print control method according to an aspect of the invention controls a print apparatus capable of printing an image consuming a recording agent in accordance with image data, and includes: obtaining image data; and creating an image for test printing that consumes a less amount of recording agent than the printing based on the obtained image data upon receiving a command to print multiple test copies, controlling the printing of at least one copy based on the obtained image data among the multiple copies, and controlling the printing of the remaining copies based on the created image data for the test printing.

The print control method according to the invention creates image data for test printing that consumes a less amount of recording agent than the printing based on the obtained image data upon receiving a command to print multiple test copies, controls the printing of at least one copy based on the obtained image data among the multiple copies, and controls the printing of the remaining copies based on the created image data for the test printing. This makes it possible to confirm a print result of multiple test copies and also possible to reduce the amount of recording agent consumed in the test printing.

BRIEF DESCRIPTION OF THE DRAWINGS

The invention will be described with reference to the accompanying drawings, wherein like numbers reference like elements.

FIG. 5 is a flowchart showing a modified example of a test print processing routine.

DESCRIPTION OF EXEMPLARY EMBODIMENTS

Figure 1:
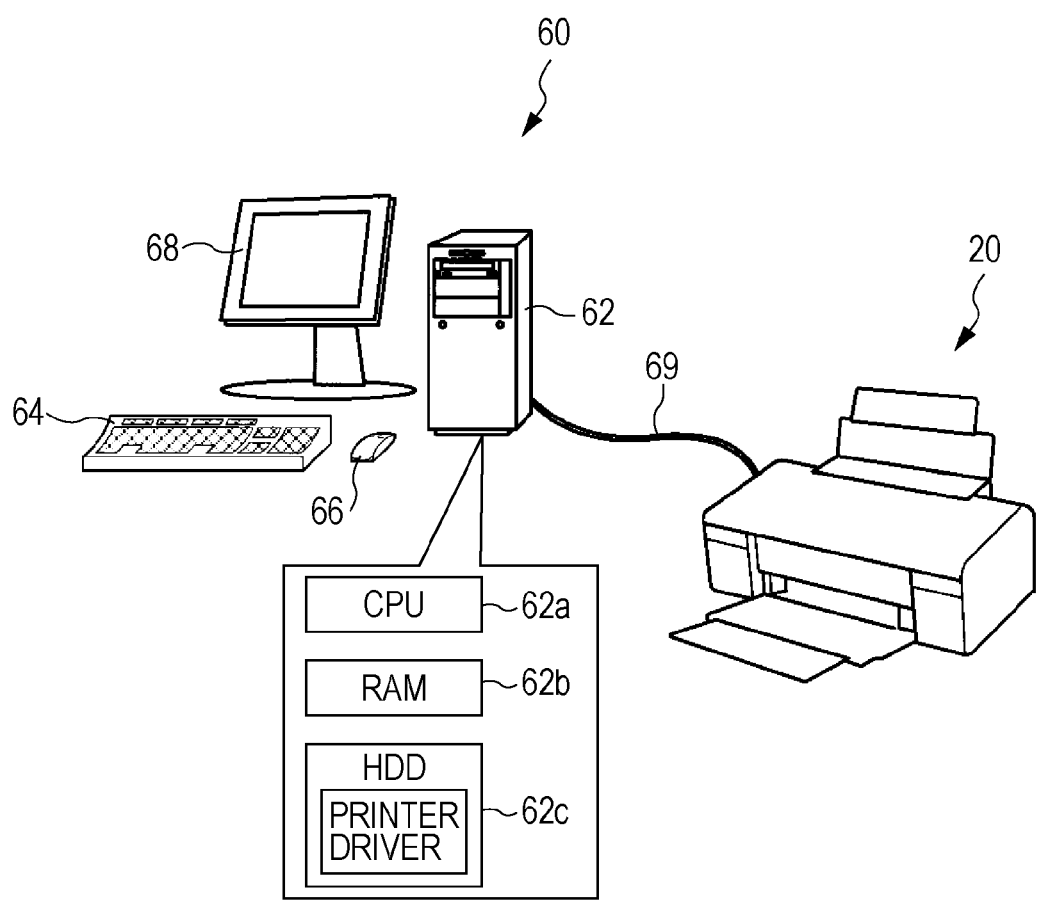
FIG. 1 is a configuration diagram schematically illustrating the configuration of a print system according to an aspect of the invention.
Figure 2:
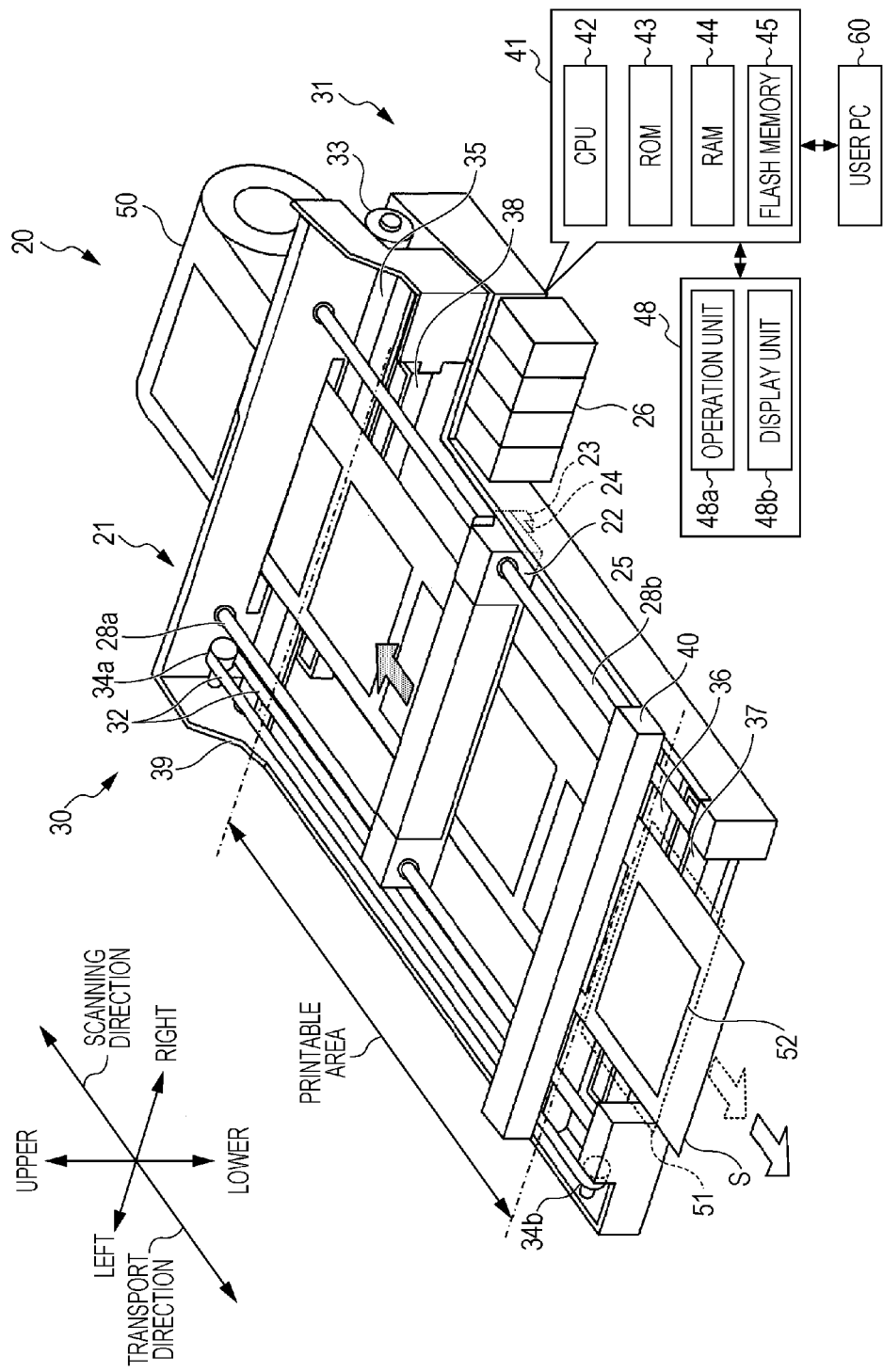
FIG. 2 is a configuration diagram schematically illustrating the configuration of a printer.

Hereinafter, an embodiment that embodies the invention will be described with reference to the drawings. FIG. 1 is a configuration diagram schematically illustrating the configuration of a print system, while FIG. 2 is a configuration diagram schematically illustrating the configuration of a printer 20.

The print system according to the embodiment is configured of a user computer (hereinafter, referred to as a "user PC") 60 and the printer 20 that are connected to each other via a cable 69. The printer 20 is configured as an ink jet printer in which roll paper 50 is mounted as recording paper and multiple pages can be printed and output on the roll paper 50 at a time as shown in FIG. 2, and includes: a paper feed mechanism 31 that feeds out the roll paper 50 from the far side to the near side in the depth direction in FIG. 2; a print mechanism 21 that has a print head 24 in which nozzles 23 are so arranged as to cover the entire width range of the roll paper 50 and prints images by ejecting ink droplets through the nozzles onto the roll paper 50 fed out by the paper feed mechanism 31; cleaning devices 37 and 38 that are respectively disposed on upstream and downstream edges in the transport direction of the roll paper 50 and clean the print head 24; a cutting device 40 that cuts off and separates an image-printed portion from the roll paper 50 when the printing is finished; an operation panel 48 that displays thereon various kinds of setting information, information for confirming the printing image and the like, and accepts input of various operational instructions from a user; and a controller 41 that controls the entirety of the printer 20.

The print mechanism 21 includes: a carriage 22 supported in a movable state by two guides 28a and 28b that are respectively arranged on right and left ends of a housing 39 along the direction in which the roll paper 50 is fed; the print head 24 mounted in the carriage 22; and ink cartridges 26 that are attached to the housing 39 and capable of supplying ink to the print head 24 through tubes (not shown). In the print mechanism 21, a carriage belt 32 fixed to the carriage 22 is stretched upon a carriage motor 34a and a slave roller 34b, and the carriage 22 is reciprocated along the direction in which the roll paper 50 is fed by driving the carriage motor 34a. Accordingly, the print mechanism 21 can print multiple pages at a time in a region defined by the entire width range of the roll paper 50 and the entire movement range of the carriage 22 without paper feeding by the paper feed mechanism 31. The print head 24 is mounted on a lower side of the carriage 22, and ejects inks of multiple colors through the nozzles 23 formed on the lower surface of the print head 24 by an operation in which a voltage is applied to each of piezoelectric elements so that the piezoelectric elements deform to pressurize the inks. Note that ink may be pressurized by air bubbles generated by the heat from a heater. The ink cartridges 26 take a so-called off-cartridge type configuration in which each of the cyan (c), magenta (M), yellow (Y), and black (K) inks is held in each individual cartridge.

The paper feed mechanism 31 includes a paper feed roller 35 disposed at an edge on the paper feed side of the roll paper 50 and a paper discharge roller 36 disposed at an edge on the paper discharge side, and transports the roll paper 50 by rotationally driving the paper feed roller 35 as well as the paper discharge roller 36 using a transport motor (not shown). The paper feed mechanism 31 intermittently transports the roll paper 50 within the movement range of the carriage 22 as a unit of transport while the printing by the print mechanism 21 and the paper feed by the paper feed mechanism 31 are alternately carried out. Note that the paper feed mechanism 31 also includes a transport belt (not shown) serving as a platen that supports the roll paper 50, which is fed toward the downstream side by the transport belt.

The cleaning devices 37 and 38 carry out a processing to remove clogs in the nozzles 23 of the print head 24; the devices form an enclosed space by sealing a nozzle face of the print head 24 and suck ink from the nozzles 23 by driving a pump (not shown) during a cleaning operation, or serve as ink receivers in a flushing operation that forcibly discharges ink from all of the nozzles 23.

The operation panel 48 includes: an operation unit 48a by which a user inputs an instruction of print settings, an instruction to start the printing and so on to the printer 20; and a display unit 48b, configured of a liquid crystal panel, that displays a menu screen for the input of print settings, information for selection of a print image, a preview image and so on. Although not shown in the drawings, the operation panel 48 further includes: a power button to turn on/off power; a menu button to display a menu screen, a copy number setting button to set the number of print copies; a set of up/down and right/left designation buttons to select a desired item, a setting value or the like; an OK button to determine a desired item, lead to the next screen or the like; a button to return to the previous screen; a print button to start printing; and so on.

The controller 41 is configured as a microprocessor having a CPU 42 as a main element, and includes a ROM 43 to store a processing program, a RAM 44 to temporarily store data, and a flash memory 45 as a nonvolatile memory whose data is maintained even after power is turned off. An operation signal and the like from the operation unit 48a are input to the controller 41 while a display signal and the like are output from the controller 41 to the display unit 48b. Furthermore, the user PC 60 is connected to the controller 41, so that a print job sent from the user PC 60 is received and executed by the controller 41.

In the printer 20, a predetermined worth of multiple pages of the roll paper 50 (for example, 4 pages) is fed out by the paper feed mechanism 31, thereafter the feed is stopped; subsequently, the print mechanism 21 prints the multiple pages at a time by ejecting ink droplets through the nozzles 23 while moving the print head 24 (carriage 22), on which the nozzles 23 covering the entire width range of the paper are arranged, in the paper feed direction; after the printing of the multiple pages, the paper feed mechanism 31 feeds out the next multiple pages' worth of roll paper 50 to let the print mechanism 21 print the next multiple pages at a time. As described above, the printing is carried out in such a manner in which the paper feed of multiple pages' worth of the roll paper 50 carried out by the paper feed mechanism 31 and the multiple pages' worth of printing carried out by the print mechanism 21 at a time are repeatedly executed.

The user PC 60 is a generic computer connected to the printer 20 via wired or wireless connection and includes a main body 62 equipped with a CPU 62a, a RAM 62b, a hard disk drive (HDD) 62c and the like, a keyboard 64 and a mouse 66 as input devices, and a display 68. A printer driver that performs print data processing and controls the printer 20 is installed in the HDD 62c of the user PC 60; when the user PC 60 accepts a print instruction through user operation accompanying an image selection, the printer driver performs print data processing to create a print job and sends the created job to the printer 20. When a user instructs the printer 20 to execute printing operation, the user can select, in addition to a regular print mode usually selected, a test print mode in which test printing is performed so as for the user to carry out settings of the printer 20, confirmation of a tone and a tint of color, confirmation of a layout of image and the like. When the test print mode is selected, print data for test printing is created in a process mentioned later, which is different from the process of the regular print mode, and is sent to the printer 20.

Figure 3:
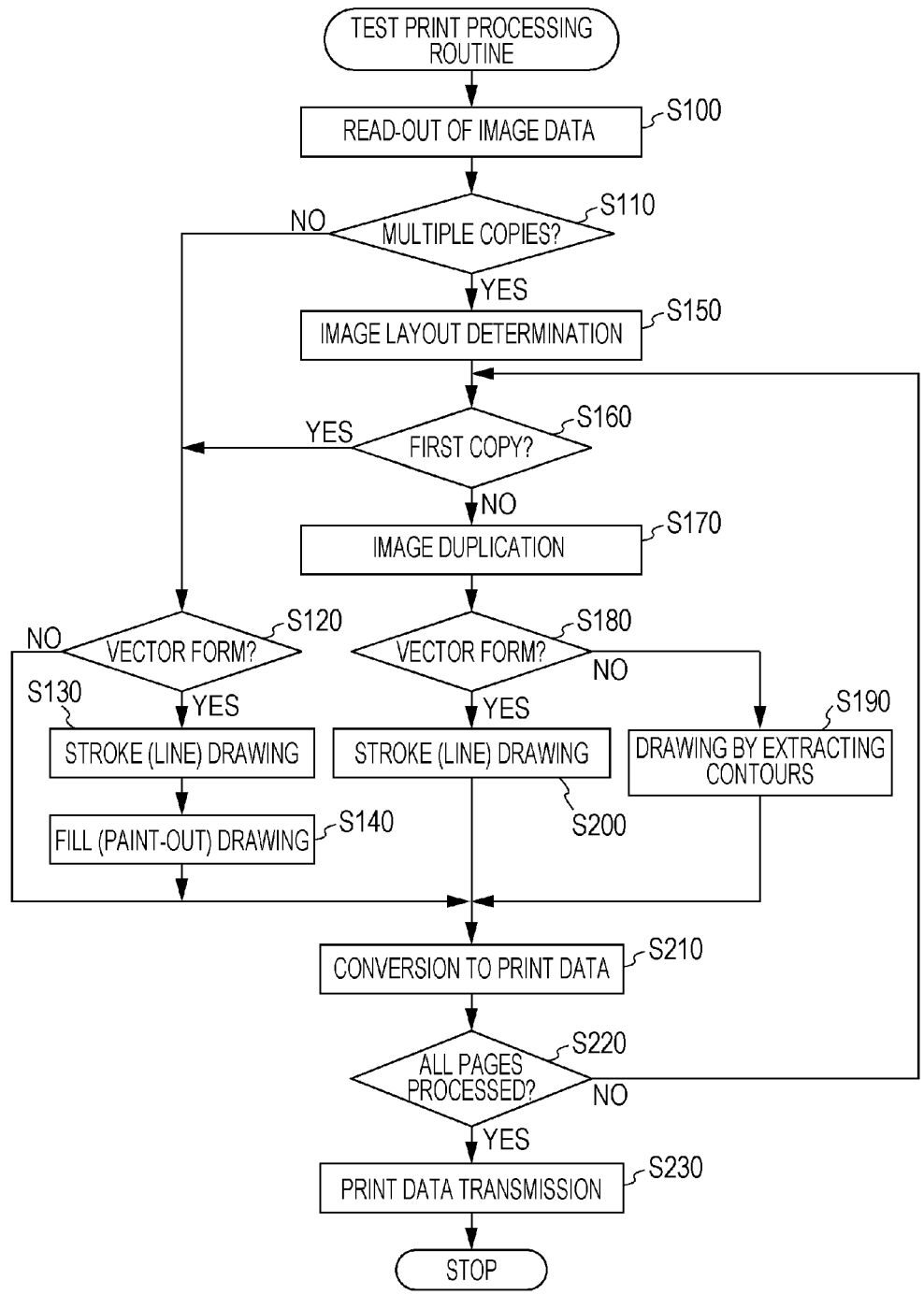
FIG. 3 is a flowchart showing an example of a test print processing routine.

Next, among the operations of the printer 20 in the configuration described above according to the embodiment, an operation that prints multiple test copies of an identical image is specifically explained. FIG. 3 is a flowchart showing an example of a test print processing routine that is executed by the CPU 62a of the user PC 60. This routine is executed when a user has selected the test print mode and an image to be printed in the test print mode.

When the test print processing routine is executed, the CPU 62a of the user PC 60 first reads out image data selected by the user (S100), and judges whether or not multiple test copies based on the image data just read out are required (S110). If the number of print copies is judged not to be plural, that is, judged to be one, then it is judged whether or not the image data read out takes a vector form or raster form (S120). In this case, the vector form has pieces of information such as coordinates of start and end points of a line, attributes of a line (for example, line thickness, curvature of a curved line, and the like), attributes of a plane surface surrounded by lines (for example, a color and a pattern) and the like in numeric values, whereas the raster form, which is also called a bit map, expresses the image data as a set of dots arranged in a lattice state. If the image data read out is judged to be in the vector form, in order to convert the image data to the bit map, stroke (line) drawing is performed to draw the contours (S130) and fill (painting-out) drawing is subsequently performed to paint out a plane surface surrounded by lines with a specified color and pattern (S140). On the other hand, if the image data read out is judged to be in the raster form, control of the routine goes to the next step S210 since the image data read out is a bit map image. In the case where the image data read out is compressed (for example, in JPEG format), a necessary decompression is carried out before going to the step S210. Subsequently, the bit map image data is resized and a color system of the data is color-converted to the CMYK color system; the color-converted CMYK data undergoes a halftone processing and becomes binarized so as to create print data (S210). Then, it is judged whether or not all pages have been processed (S220). Because the judgment at the step S110 is that only one test copy of the image should be printed, the judgment at the step S220 is "YES", and the created print data is sent to the printer 20 (S230), then the routine stops. Therefore, in the case where only one test copy is printed in the manner described above, the same image processing as that of the regular printing is performed. Thus, the user can check whether or not there is any problem in the setting of the printer 20, the image data and the like by checking the result of test printing.

Figure 4A:
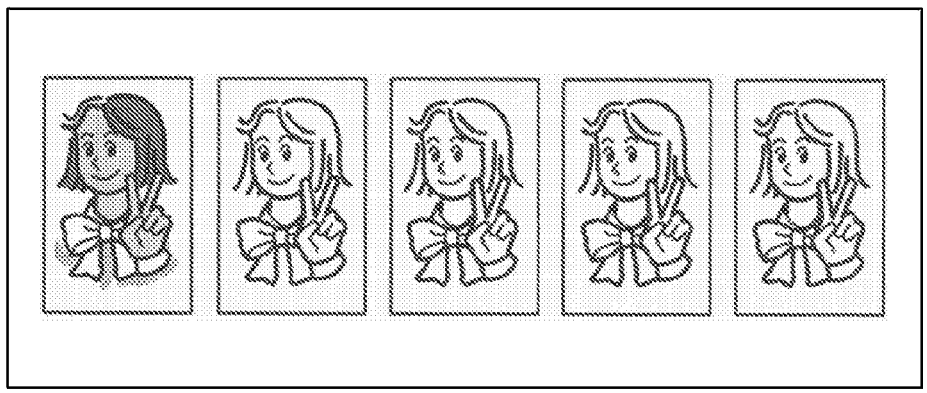
FIGS. 4A and 4B are descriptive diagrams that show print results of multiple test copies and an example of comparison between the print results according to the embodiment.
Figure 4B:
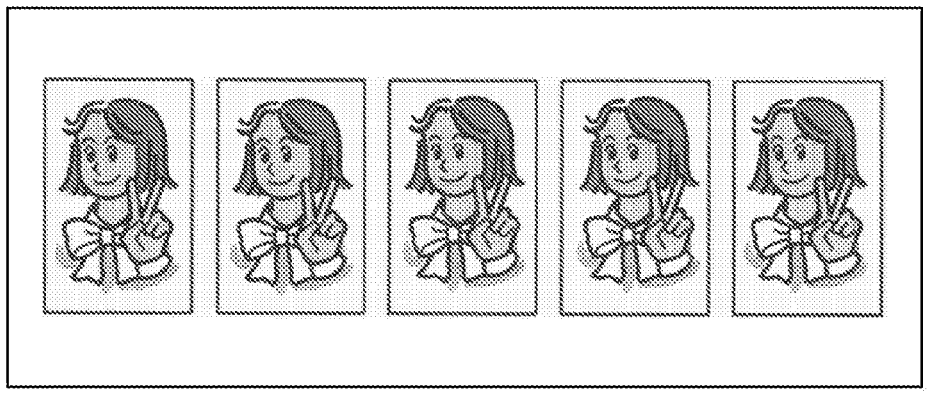

When it is judged at the step S110 that multiple test copies of identical image data should be printed, an arrangement position (layout) of the image in each page is determined (S150). Next, it is judged whether or not the first copy is to be printed (S160). In the case of the first copy printing, the aforementioned steps S120, S130, S140 and S210 are performed in which it is judged whether the image data read out is in the vector form or in the raster form (S120) at first; if it is the vector form, stroke drawing and fill drawing are performed to convert the image date to the bit map, and the converted bit map image data is consequently converted to the print data. Then, it is judged if all pages have been processed (S220). Here, because the printing of multiple test copies of the identical image is considered, the judgment at the step S220 is "NO" and control of the routine goes back to the step S160. Since the judgment at the step S160 is that the copy is not the first one, the image data is duplicated (S170) and it is judged whether or not the duplicated data is in the vector form or in the raster form (S180). If the data is judged to be raster-formed one, edges of the data are extracted by using, for example, the Laplacian filter or the like, and line drawing of the extracted edges is performed to create a line drawing (S190). On the other hand, if the duplicated data is judged to be vector-formed one, only stroke drawing is performed to create the data of bit map (S200), and the created data is converted to the print data (S210). Until it is judged that all pages are processed (S220), control of the routine returns to S160 and the steps S160 through S220 are iterated; thereafter, the created print data is transmitted to the printer 20 (S230) and the routine stops. In the case where multiple test copies of the identical image are printed, the image processing that is the same as that of the regular print is performed on the first copy. However, in the printing of the second and following copies, because print data is created from an image made by extracting only contour portions, the image for printing is made simpler, thereby making it possible to reduce the consumption of ink. At this time, the user can confirm a tone and tint of color of the image by the first copy, and also can confirm an arrangement position (layout) of the image and the overall feeling and print conditions by the first copy as well as the second and following copies; therefore, the user can confirm the test printing without any difficulty. FIGS. 4A and 4B show the print results of multiple test copies according to the embodiment and an example of comparison between the print results. FIG. 4A is a test print result in which the first page is printed using the same image that is printed in the regular printing while the second and following pages are printed using an image configured of only extracted contour portions. FIG. 4B is a test print result in which the same image that is used in the regular printing is printed on all pages.

The correspondence between the configuration elements of the embodiment and the configuration elements of the aspects of the invention will be clarified here. The CPU 62*a* that executes the step S100 of the test print processing routine shown in FIG. 3 according to the embodiment corresponds to an "image data obtaining unit" of the aspects of the invention, while the CPU 62*a* that executes processing of the steps S110 through S230 of the test print processing routine corresponds to a "print control unit" thereof. Further, an example of the print control unit according to the invention is also clarified through the description of operations of the user PC 60 in the embodiment.

According to the embodiment described above in detail, when multiple test copies of an identical image are required, the first copy is printed using the same image that is to be printed in regular printing, while the second and following copies are printed using a simplified image which is made by extracting only contour portions of the image. Accordingly, the amount of ink consumed in the test printing described above is less than that in the case where all the test pages are printed using the same image that is used in regular printing, and in addition, the test printing can be carried out in a shorter time. At this time, a user can confirm a tone and tint of color of the image by the first copy of the image, and also can confirm an arrangement position (layout) of the image and the overall feeling and print conditions by the first copy as well as the second and following copies of the image. Therefore, the confirmation of the test print can be carried out without any difficulty.

In the embodiment mentioned above, when multiple test copies of an identical image are required, only contour portions of the image are extracted to create a simplified image, which is converted to print data for the second and following test copies; however, when a color image is selected for the test printing, it is preferable that a single-colored image be created from the selected color image and converted to the print data for the test printing. In this case, it is also preferable that a test print processing routine of FIG. 5 be executed in place of the test print processing routine of FIG. 3. Among the steps of the test print processing routine in FIG. 5, steps that are the same as those in FIG. 3 in terms of processing are given the same step numbers as in FIG. 3, and detailed descriptions of such steps are omitted to avoid redundancy. In the test print processing routine of FIG. 5, when multiple test copies of an identical image are required, the following steps are carried out for the second and following copies: a line drawing is created by drawing only contour portions of the image (S180 through S200); thereafter it is judged whether or not the image is a color image (S300); if it is a color image, a color of ink with the least amount of accumulated consumption is judged among the colors of CMYK (S310); the color image is made single-colored by the judged color (S320); and then the single-colored image is converted to print data (S210). The single-coloring processing of the step S320 may be carried out by preparing a single-coloring filter of each of the CMYK colors and storing each of the single-coloring filters in the HDD 62*c*, for example, and by selecting a single-coloring filter of the judged ink color and applying it to the color image so as to cause the color image to be single-colored. In order to obtain an accumulation value of ink consumption of each of the CMYK colors, after the creation of the print data in S210, calculation of ink consumption is performed for each color based on the created print data, and each calculation result is added to the previous accumulation value of ink consumption of each color (S330). Accordingly, as the second and following test copies are printed using the least frequently used-color ink, each color ink is equally consumed in test printing, and in addition, clogging in the nozzles 23, caused when a specific color has not been used for a long time, can be suppressed from occurring. Since what is needed is that the least frequently used-color of ink should be consumed, the color employed in the single-coloring processing of S320 does not necessarily need to be completely matched to the least frequently used-color of ink, and can be a color near to the least frequently used-one. In this variation example, although a color image is single-colored using the least frequently used-color of ink, the color to be employed in the single-coloring processing may be selected by a user. In such case, it is preferable that an ink color selection screen be displayed on the display 68 so as to accept input from the user through the keyboard 64, the mouse 66 or the like.

In the embodiment described above, when multiple test copies of an identical image are required, the first test copy is printed using the same image that is used in regular printing while the second and following copies are printed using an image in which only the contour portions are drawn or using an image that has been single-colored. However, the image for test printing is not limited thereto, and any image that is so simplified as to consume less ink than the image for regular printing can be adopted. For example, it is acceptable in the second and following copies that only the frame of a printing area is printed, or an image that has been made light-colored is printed, and so on.

In the embodiment mentioned above, when multiple test copies of an identical image are required, the same image that is used in regular printing is printed in the first copy, while a simplified image is printed in the second and following copies. However, as long as a simplified image is printed at least one copy, the same image that is used in regular printing can be used in test printing through the remaining multiple copies. Furthermore, it is preferable that a simplified image be printed in the first test copy and the same image that is used in regular printing be printed in the $N^{th}$ test copy (N is an integer equal to or less than the number of test copies and is equal to or greater than 2). The ink consumption of this case is also less than that of the case where the same image that is used in regular printing is printed on all pages.

Further, in the case where a user has designated it to be sufficient enough if a tone and tint of color of the image can be confirmed by the image printed on the first page, it is preferable that the same image that is used in regular printing be test-printed only on the first page among the multiple pages and a simplified image be test-printed on the other pages.

Figure 6:
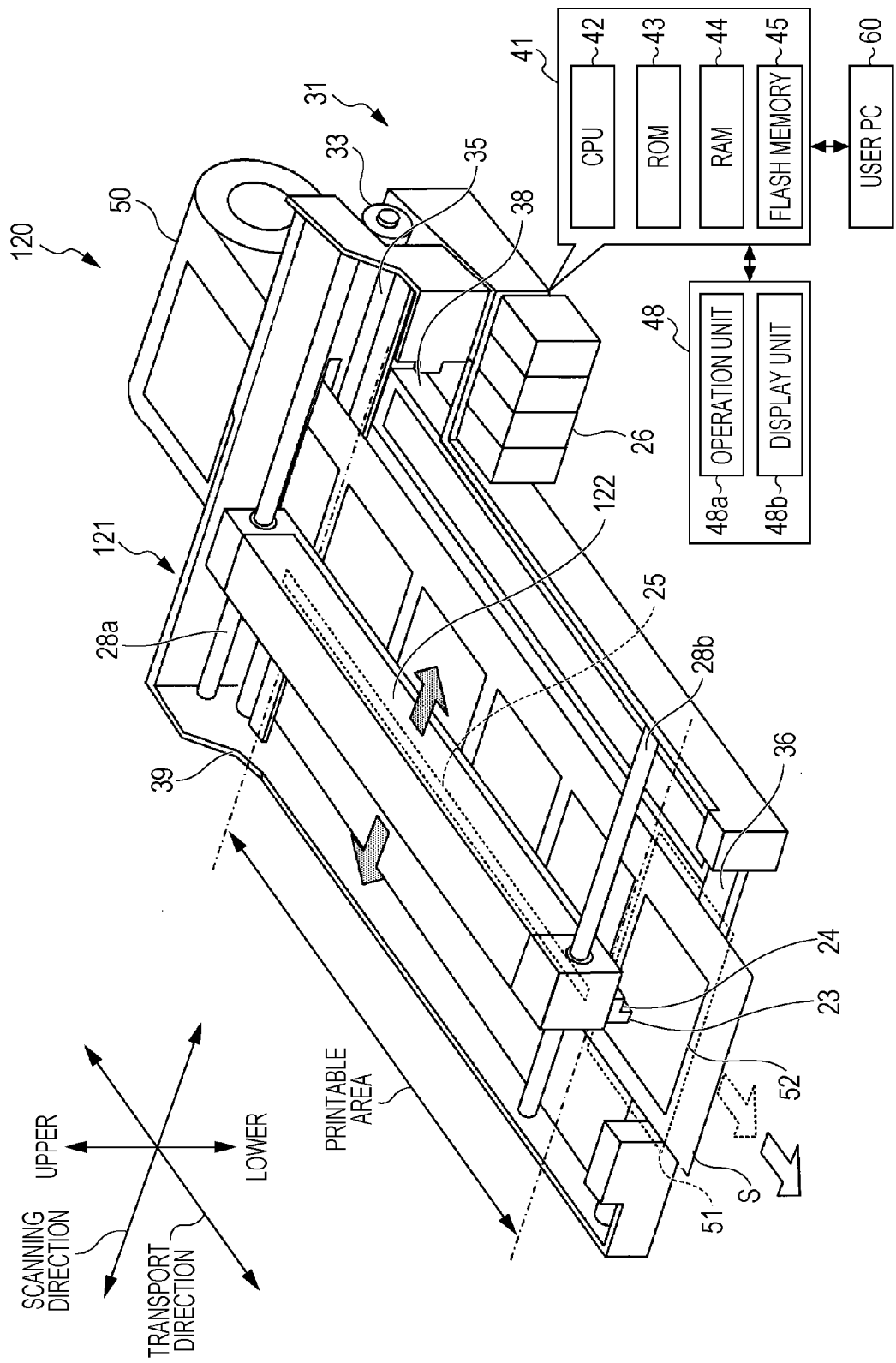
FIG. 6 is a configuration diagram schematically illustrating the configuration of a modified example of a printer.

In the above-mentioned embodiment, the print head 24 on which the nozzles 23 are so arranged as to cover the entire width range of the roll paper 50 prints a plurality of images at a time while the carriage 22 in which the print head 24 is mounted scans in the same direction as the transport direction of the roll paper 50. However, the operation of printing is not limited to the embodiment. For example, printing may be performed on long-sized paper that is not rolled, or the printer may be configured as a usually so-called line printer in which a print head equipped with nozzles so arranged as to cover the entire width range of the roll paper is fixedly disposed and this print head prints images on the roll paper while making a paper feed mechanism feed the roll paper; alternatively, the printer may be configured as a usually so-called serial printer in which printing of images is performed by a print head equipped with the nozzles 23 so arranged as to cover only part of the width of the roll paper 50 while making a carriage in which the print head is mounted scan in the direction orthogonal to the transport direction of the paper roll 50. Further, as shown in FIG. 6, while making a carriage 122 in which the print head 24 is mounted scan in the direction orthogonal to the transport direction of the roll paper 50, printing of images is performed by the print head 24 equipped with the nozzles 23 so arranged as to cover a predetermined portion of the roll paper 50 in the transport direction of the roll paper 50.

In the embodiment mentioned above, although an off-carriage type printer which holds the ink cartridges 26 on the side of the housing 39 is configured, an on-carriage type printer which holds the ink cartridges 26 on the carriage 22 may also be configured.

In the embodiment mentioned above, although the invention is applied to the control of the printer 20, it can be applied to the control of a multifunctional printer equipped with a scanner and also can be applied to the control of a facsimile machine. Further, although the embodiment described thus far has embodied the aspects of the invention as a print control apparatus, the aspects of the invention can be embodied as a print control method as well as a print control program.

Note that the invention is not limited to the aforementioned embodiments; the invention can be realized in various ways according to the aspects of the invention as long as they are within the technical scope of the invention.

What is claimed is:

1. A print control apparatus that controls a print apparatus capable of printing an image consuming a recording agents of multiple colors in accordance with image data, the print control apparatus comprising:
    an image data obtaining unit that obtains a color image data; and
    a print control unit that creates image data for test printing that consumes a less amount of recording agent than the printing based on the obtained image data upon receiving a command to print multiple test copies, controls the printing of at least one copy of the obtained image data among the multiple copies, and controls the printing of the remaining copies of the created image data for the test printing,
    wherein the print control unit is a unit that creates an image for the test printing by causing the obtained color image to be single-colored upon receiving the command to print multiple test copies.

2. A print control apparatus that controls a print apparatus capable of printing an image consuming a recording agent in accordance with image data, the print control apparatus comprising:
    an image data obtaining unit that obtains image data; and
    a print control unit that creates image data for test printing that consumes a less amount of recording agent than the printing based on the obtained image data upon receiving a command to print multiple test copies, controls the printing of at least one copy of the obtained image data among the multiple copies, and controls the printing of the remaining copies of the created image data for the test printing,
    wherein the image data obtaining unit is capable of obtaining raster-type image data; and
    the print control unit is a unit that extracts edges of the obtained raster-type image data and creates an image for the test printing by line drawing upon receiving the command to print multiple test copies.

3. The print control apparatus according to claim 2,
    wherein the image data obtaining unit is capable of obtaining vector-type image data; and
    the print control unit is a unit that creates an image for the test printing by omitting the fill of the obtained vector-type image data upon receiving the command to print multiple test copies.

4. The print control apparatus according to claim 1,
    wherein the image data obtaining unit is capable of obtaining vector-type image data; and
    the print control unit is a unit that creates an image for the test printing by omitting the fill of the obtained vector-type image data upon receiving the command to print multiple test copies.

5. The print control apparatus according to claim 1, further including a usage history memory unit that stores a usage history of each of the recording agencies of multiple colors,
    wherein the print control unit judges a least frequently used-recording agent from among the recording agencies of multiple colors based on the stored usage histories and creates an image for the test printing by causing the obtained color image to be single-colored using the color corresponding to the color of the recording agent that has been judged to be the least frequently used-recording agent.

6. The print control apparatus according to claim 1, further including a color designation receiving unit that receives the designation of a color from a user to be used for making a single-colored image,
    wherein the print control unit is a unit to create an image for the test printing by causing the obtained color image to be single-colored using a designated color.

7. A program stored in a non-transitory computer-readable medium that causes a computer to function as the print control apparatus according to claim 1.

8. A program stored in a non-transitory computer-readable medium that causes a computer to function as the print control apparatus according to claim 2.

9. A program stored in a non-transitory computer-readable medium that causes a computer to function as the print control apparatus according to claim 4.

10. A program stored in a non-transitory computer-readable medium that causes a computer to function as the print control apparatus according to claim 5.

11. A program stored in a non-transitory computer-readable medium that causes a computer to function as the print control apparatus according to claim 6.

12. A print control method that controls a print apparatus capable of printing an image consuming a recording agents of multiple colors in accordance with image data, comprising:
    obtaining a color image data; and
    creating an image for test printing that consumes a less amount of recording agent than the printing based on the obtained image data upon receiving a command to print multiple test copies, controlling the printing of at least one copy based on the obtained image data among the multiple copies, and controlling the printing of the remaining copies based on the created image data for the test printing,
    wherein creating the image for the test printing includes causing the obtained color image to be single-colored upon receiving the command to print multiple test copies.

* * * * *